United States Patent
Koike et al.

(10) Patent No.: US 7,688,178 B2
(45) Date of Patent: Mar. 30, 2010

(54) REMOTE START CONTROLLER

(75) Inventors: Masaki Koike, Hyogo (JP); Minoru Yoshimura, Hyogo (JP); Yasuomi Kimura, Hyogo (JP)

(73) Assignee: Fujitsu Ten Limited, Kobe-Shi (JP)

( * ) Notice: Subject to any disclaimer, the term of this patent is extended or adjusted under 35 U.S.C. 154(b) by 1078 days.

(21) Appl. No.: 11/256,993

(22) Filed: Oct. 25, 2005

(65) Prior Publication Data

US 2006/0087405 A1  Apr. 27, 2006

(30) Foreign Application Priority Data

Oct. 27, 2004  (JP)  ............................. 2004-311820

(51) Int. Cl.
*H04B 1/02* (2006.01)

(52) U.S. Cl. .................. 340/5.64; 340/5.2; 340/5.72; 340/542; 340/10.5; 340/307

(58) Field of Classification Search ............... 340/5.73, 340/542, 307, 5.2, 10.5; 307/10.1; 187/287
See application file for complete search history.

(56) References Cited

U.S. PATENT DOCUMENTS 6,028,372 A * 2/2000 West et al. ................. 307/10.6
6,116,201 A * 9/2000 LaBelle ..................... 123/179.2
6,297,731 B1 * 10/2001 Flick ....................... 340/426.16
2004/0262068 A1  12/2004 Matsubara et al.

FOREIGN PATENT DOCUMENTS

| JP | A 09-303020 | 11/1997 |
|---|---|---|
| JP | A 09-322265 | 12/1997 |
| JP | A 10-16713 | 1/1998 |
| JP | A 10-131569 | 5/1998 |
| JP | A 2001-049917 | 2/2001 |
| JP | A 2002-130034 | 5/2002 |
| JP | A 2004-68626 | 3/2004 |
| KR | 10-0210351 B1 | 7/1999 |

OTHER PUBLICATIONS

Notification of Reasons for Refusal issued in Japanese Patent Application No. 2005-310623; Dec. 1, 2009, with English-language translation.

* cited by examiner

*Primary Examiner*—Vernal U Brown
(74) *Attorney, Agent, or Firm*—Oliff & Berridge, PLC

(57) ABSTRACT

A remote start controller is mounted on a vehicle, which includes a keyless entry device for controlling a locking action of doors of the vehicle in response to a user's operation with respect to a lock button of a transmitter. The remote start controller includes a CPU. Upon detecting that the lock button of the transmitter is operated in a first predetermined way, the CPU causes an engine of the vehicle to start.

8 Claims, 12 Drawing Sheets

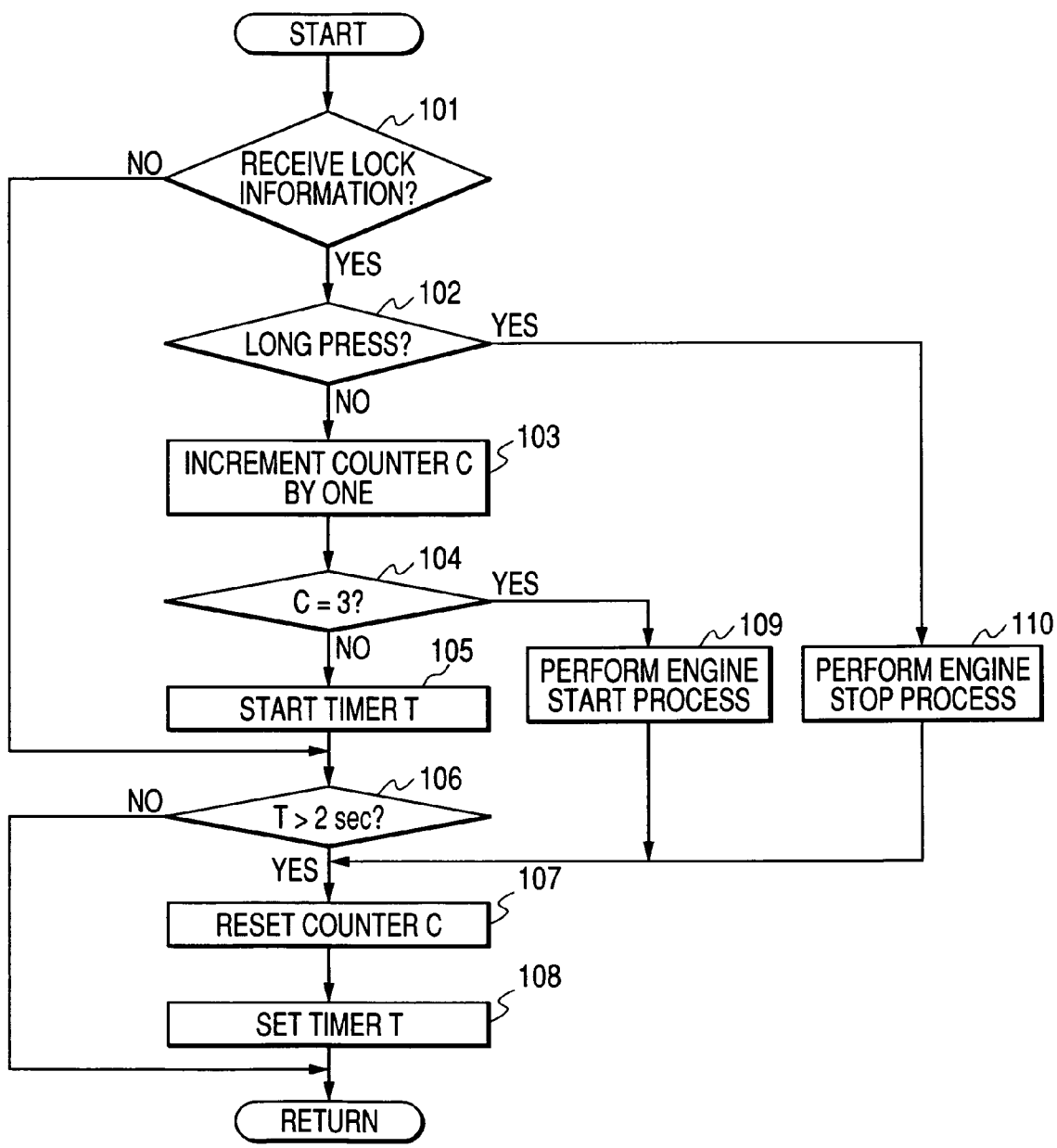

ENGINE START CONDITION:
X1 ≤ 2.5 sec, X2 ≥ 2.4 sec, AND 0 sec < X3 ≤ 0.8 sec

ENGINE STOP CONDITION: X4 ≥ 1.6 sec

REMOTE START CONTROLLER

BACKGROUND OF THE INVENTION

1. Field of the Invention

This invention relates to a remote start controller for a vehicle, which is used to start the engine of the vehicle parked at a location distant from a user, such as a parking lot.

2. Description of the Related Art

In a vehicle such as an automobile, a starter motor is actuated using a battery installed in a vehicle body as a power supply and an engine is cranked by the rotation force of the motor, to start the engine. To actuate the starter motor, a driver inserts an ignition key into the key hole of an ignition switch and turns the ignition key at a predetermined angle, thereby turning on the ignition switch and a starter switch. These days, a device for starting an engine by remote operation of a driver who does not ride in a vehicle has been often used for starting an air conditioner before starting the vehicle in winter or summer.

Such a remote start controller of a vehicle includes a transmitter carried with a driver, a receiver and a controller attached to the vehicle. When the receiver receives a start signal from the transmitter and the controller controls starting of the engine, only if safety conditions are satisfied, the controller generates and outputs pseudo signals to each line of the ignition switch and starter switch to drive the starter motor for starting the engine.

On the other hand, these days, a keyless entry device for controlling a locking action of doors of a vehicle by remote operation of a transmitter has also become widespread and has been installed in a large number of vehicles. The remote start controller and the keyless entry device each require a transmitter. Therefore, users must carry two transmitters; this is cumbersome. The same goes for the case where an antitheft apparatus for setting a security function for a vehicle by remote operation and the remote start controller are installed.

Thus, it is desirable that it should be made possible to control these apparatuses with a common transmitter; hitherto the keyless entry device and the antitheft apparatus have been controlled with a common transmitter. For example, a lock button and an arming button of security are provided as one button and an unlock button and a disarming button of security are provided as one button. When the lock button is operated, security is set in conjunction with the door locking. When the unlock button is operated, security is disarmed in conjunction with door unlocking. However, with the remote start controller, if operation is associated with the lock button or the unlock button, since the driver does not always want to start or stop the engine when locking or unlocking the doors, it would be inconvenient to the user.

On the other hand, to make it possible to control the keyless entry device and the remote start controller with a common transmitter, JP Hei. 9-303020 has proposed that a transmitter is provided with two switches and one of the switches is used as a mode change switch. Specifically, the transmitter is usually operated in a keyless entry mode. In the keyless entry mode mode, a lock command and an unlock command are transmitted by operating the two switches. If a user keeps operating one switch for a predetermined time, the mode is switched from the keyless entry mode to an engine control mode. In the engine control mode, an engine start command and an engine stop command are transmitted by operating the two switches.

Likewise, to make it possible to control the keyless entry device and the remote start controller with a common transmitter, JP Hei. 9-322265 A has proposed that a position of an antenna of a transmitter is changed manually between keyless entry operation and remote start operation and that the transmitter selectively transmits a door lock command or an engine start command in response to the position of the antenna when the user operates the common switch.

Further, to make it possible to control a security apparatus and the remote start controller with a common transmitter, JP 2002-130034 A has proposed that the transmitter is provided with an engine start switch and a security switch.

SUMMARY OF THE INVENTION

Various apparatus intended for controlling a remote start controller with a transmitter of a keyless entry device or an antitheft apparatus have been proposed as described above. It is assumed that one switch is used as the mode change switch and that an apparatus is configured to change from one mode to another mode when the one switch is operated for a predetermined time. In this case, in order to start the engine, a user needs to keep operating the one switch for the predetermined time or more to change the mode, which involves a problem of cumbersomeness.

If an attempt is made to switch the operation mode by manually changing the position of the antenna of the transmitter, an antenna position detection circuit becomes necessary. Thus, the configuration of the transmitter becomes complicated; this is a problem.

Further, if the transmitter is provided with function switches, the number of the switches increases and the transmitter is upsized; this is a problem.

As described above, from the viewpoint of simplicity in configuration of a device and operationality of the device, there is no satisfactory device for controlling a remote start controller with the transmitter of a keyless entry device or an antitheft apparatus.

For the keyless entry device or the antitheft apparatus, usually a user operates the transmitter in the range where the user views the vehicle; whereas, the user often operates the transmitter of the remote start controller in locations where the user cannot see the vehicle such as the inside of a house. This is because it takes time to warm or adjust the cabin temperature. Therefore, to use the transmitter for controlling both the remote start controller and another apparatus, it is also necessary to consider security.

The invention controls a remote start controller with a transmitter of a keyless entry device or an antitheft apparatus with a simple configuration, while considering safety.

According to one embodiment of the invention, a remote start controller is mounted on a vehicle, which includes a keyless entry device for controlling a locking action of doors of the vehicle in response to a user's operation with respect to a lock button of a transmitter. The remote start controller includes a CPU. Upon detecting that the lock button of the transmitter is operated in a first predetermined way, the CPU causes an engine of the vehicle to start.

According to another embodiment of the invention, a remote start controller is mounted on a vehicle, which includes a keyless entry device for controlling a locking action of doors of the vehicle in response to a user's operation with respect to a lock button of a transmitter. The remote start controller includes a CPU. Upon detecting that the lock button of the transmitter is operated in a second predetermined way, the CPU causes an engine of the vehicle to stop. Upon detecting that the lock button of the transmitter is operated in a second predetermined way different from the first predetermined way, the CPU may cause the engine to stop.

According to these configurations, the lock button is also used for engine start control, whereby the configuration of the transmitter can be simplified while theft is prevented. As the lock button is also used for engine stop control, the theft at a time when the engine is stopped can be prevented. That is, the lock button is also used for remotely starting and stopping the engine, so that the doors can always be kept in the lock state and safety can be ensured. Since remote starting or stopping of the engine can be selected according how a user operates a single button (lock button), an operation, which a user is required to perform, can be simplified without upsizing the transmitter.

According to one embodiment of the invention, the keyless entry device may output reception information transmitted from the transmitter. The CPU may detect how the lock button of the transmitter is operated, on a basis of the reception information output from the keyless entry device.

Alternatively, the CPU may detect how the lock button of the transmitter is operated on a basis of a drive signal output from the keyless entry device to a lock actuator of the vehicle.

According to these configurations, the remote start controller detects how the user operates the button of the transmitter based on the reception information output from the keyless entry device or based on the drive signal sent to the lock actuator. Therefore, it is made possible to easily detect how the user operates the button.

According to one embodiment, a remote start controller includes a keyless entry section and a remote start controlling section. The keyless entry section controlling a locking action of doors of a vehicle in response to a user's operation with respect to a lock button of a transmitter. The remote start controls section that controls starting of an engine of the vehicle. Upon detecting that the lock button of the transmitter is operated in a first predetermined way, the remote start controlling section causes the engine of the vehicle to start. Upon detecting that the lock button of the transmitter is operated in a second predetermined way different from the first predetermined way, the remote start controlling section causes the engine of the vehicle to stop.

According to this configuration, the remote start controller includes the keyless entry section, which controls the locking action of the doors of the vehicle in response to the user's operation with respect to the lock button of the transmitter, and the remote control section, which remotely starts the engine. Therefore, the single apparatus can be provided with the keyless entry function and the remote start function, and the configuration can be simplified. The lock button is also used for remotely starting and stopping the engine. Thus, when the engine is remotely started and stopped, the doors can always be kept in the lock state and safety can be ensured. Further, remote starting and stopping of the engine can be executed according to the operation mode of the single button. Therefore, an operation, which a user is required to perform, can be simplified without upsizing the transmitter.

According to one embodiment of the invention, a remote start controller is mounted on a vehicle, which includes an antitheft apparatus for setting a security function for the vehicle in response to a user's operation with respect to an arming button of a transmitter. The remote start controller includes a CPU. Upon detecting that the arming button of the transmitter is operated in a first predetermined way, the CPU causes an engine of the vehicle to start.

Upon detecting that the arming button of the transmitter is operated in a second predetermined way different from the first predetermined way, the CPU may cause the engine to stop According to one embodiment of the invention, a remote start controller is mounted on a vehicle, which includes an antitheft apparatus for setting a security function for the vehicle in response to a user's operation with respect to an arming button of a transmitter. The remote start controller includes a CPU. Upon detecting that the arming button of the transmitter is operated in a second predetermined way, the CPU causes an engine of the vehicle to stop.

According to those configurations, the arming button of the antitheft apparatus is also used for remote start and stop control of the engine. Therefore, the configuration of the transmitter can be simplified while the theft at a time when the engine is remotely started and stopped is prevented. That is, the arming button is used for remotely starting and stopping the engine, so that when the engine is remotely started and stopped, the security lock state can always be kept and safety can be ensured. Remote starting and stopping of the engine can be executed according to the operation mode of the single button. Therefore, an operation, which a user is required to perform, can be simplified without upsizing the transmitter.

BRIEF DESCRIPTION OF THE DRAWINGS

In the accompanying drawings:

FIG. 2 is a flowchart to show the operation of the remote start controller in FIG. 1;

DETAILED DESCRIPTION OF EMBODIMENTS OF THE INVENTION

Embodiments of a remote start controller of the invention will be discussed with reference to the accompanying drawings.

First Embodiment

Figure 1:
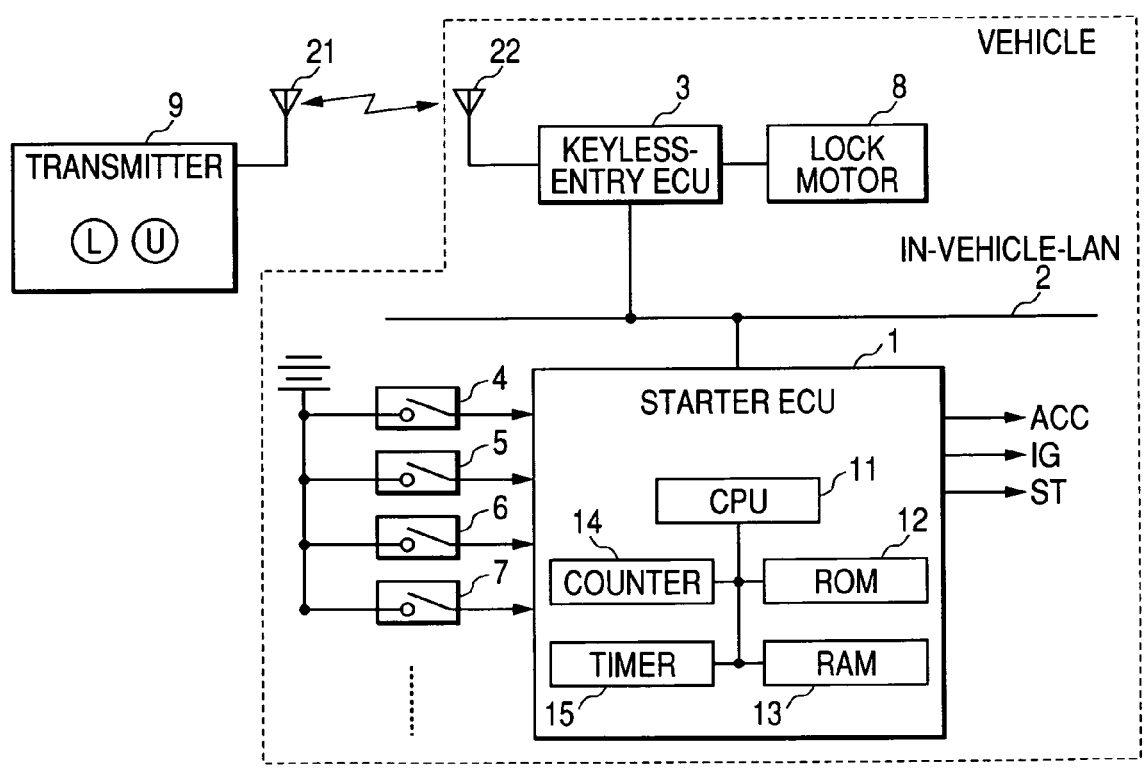
FIG. 1 is a schematic block diagram to show a remote start controller for remotely starting and stopping an engine based on reception information of a lock command from a keyless-entry ECU.

FIG. 1 is a schematic block diagram to show a remote start controller of a first embodiment of the invention. As shown in the figure, a starter ECU 1 serving as a remote start controller is connected to a keyless-entry ECU 3 through an in-vehicle LAN 2.

The starter ECU 1 includes a CPU 11, ROM (Read-Only Memory) 12, RAM (Random Access Memory) 13, a counter 14 and a timer 15. The CPU 11 controls the hardware components of the starter ECU 1 and executes various programs of engine starting, stopping, etc., based on programs stored in the ROM 12. The RAM 13 is implemented as SRAM, etc., for storing temporary data generated during program execution. The counter 14 and the timer 15 perform a count process and a timekeeping process. The counter 14 and the timer 15 may be implemented not only as hardware, but also as software using the CPU 11, the ROM 12 and the RAM 13.

Inputs to the starter ECU 1 are outputs of various switches and sensors such as a hood SW 4 for detecting the open or closed state of a hood, a parking SW 5 for detecting that a shift lever is at a parking position, a stop SW6 for detecting that a brake is in an operation state, and a courtesy SW 7 for detecting the open or closed state of each door. When the engine is started, whether or not a vehicle is in the safety state is checked from the switch and sensor outputs (e.g., the vehicle is in the safety state if the hood is closed, the shift lever is at the parking position and the doors are closed). If the safety state is confirmed, ACC output, IG output, and ST output are output subsequently to start the engine. The ACC output is output to an ACC relay (not shown) for supplying power to an ACC circuit of the vehicle. The IG output is output to an IG relay (not shown) for supplying power to an ignition circuit of the vehicle. Also, the ST output is output to a starter starting relay (not shown) for driving a starter motor to start the engine.

On the other hand, the keyless-entry ECU 3 includes a CPU, memory, etc., (not shown). Also, the keyless-entry ECU 3 has an antenna 22, and outputs a drive signal to a lock actuator of a lock motor 8 to drive a door lock mechanism for locking/unlocking doors. A transmitter 9 is portable and can be carried outside a vehicle. The transmitter 9 includes an antenna 21, a lock button L, an unlock button U, a lock switch 91, an unlock switch 92, a control unit 93, a transmitting section 94 and a receiving section 95. The lock switch 91 and the unlock switch 92 are conjunction with the lock button L and the unlock button U, respectively. The control unit 93 includes a CPU and memory (not shown). The control unit 93 generates various commands (codes) in accordance with user's operations with respect to the lock button L and unlock button U, and causes the transmitting section 94 to transmit through the antenna 21 the generated commands, an ID code stored in the memory, and the like. Upon receiving a signal through the antenna 21, the receiving section 94 outputs the received signal to the control unit 93. The transmitter 9 may be not only a general remote control, but also any device so long as the user can perform remote control with it, such as a mobile telephone.

When the keyless-entry ECU 3 receives through the antenna 22 a lock/unlock command, which has been transmitted from the transmitter 9 through the antenna 21, the keyless-entry ECU 3 outputs a drive signal to the lock actuator of the lock motor 8 in accordance with the lock or unlock command transmitted from the transmitter 9. At the same time, the keyless-entry ECU 3 outputs reception information to the in-vehicle LAN 2. The reception information includes lock command information or unlock command information from the transmitter 9, and short-press information indicating that the lock button L or the unlock button U is turned on within 3 seconds or long-press information indicating that the lock button L or the unlock button U is turned on for 3 seconds or more.

The starter ECU 1 receives the reception information from the keyless-entry ECU 3 via the in-vehicle LAN 2, detects button operation information of the transmitter 9 from the reception information and performs start or stop process of the engine. An example of the operation of the starter ECU 1 will be described below with reference to a flowchart shown in FIG. 2 and a button-operation state diagram shown in FIG. 3. In the example, when the starter ECU 1 detects the lock command information output from the keyless-entry ECU 3 three times at intervals of within 2 seconds, the starter ECU 1 performs the engine start process. Also, when the starter ECU 1 detects the lock command information and the long-press information, the starter ECU 1 performs the engine stop process.

When a user turns on the lock button L of the transmitter 9, the transmitter 9 transmits a lock command to the keyless-entry ECU 3 through the antenna 21 during the time period over which the lock button L is turned on. Upon receiving the lock command through the antenna 22, the keyless-entry ECU 3 performs lock control of the lock motor 8 to lock the doors of the vehicle in response to the lock command. Also, the keyless-entry ECU 3 determines whether or not the lock button L is turned on for 3 seconds or more, and outputs the lock command information and the short-press information or the long-press information, which is the outcome of the determination, to the in-vehicle LAN 2 as the reception information.

On the other hand, the CPU 11 of the starter ECU 1 always executes an engine start/stop program shown in the flowchart of FIG. 2. When the program is started, first the CPU 11 determines whether or not the lock command information (reception information including the lock command information) is received (step 101). If the CPU 11 concludes that lock command information is not received, the program goes to step 106. If the CPU 11 concludes at step 101 that the lock command information is received, the CPU 11 determines whether the reception information includes short-press information or long-press information as well as the lock command information (step 102). If the reception information includes the short-press information, the CPU 11 increments count C of the counter 14 by one (step 103).

Next, the CPU 11 determines whether or not the count C of the counter 14 is equal to 3 (step 104). If the count C is not equal to 3, the CPU 11 sets time T of the timer 15 to 0 and causes the timer 15 to start measuring interval between pieces of the lock command information (step 105). Then, the CPU 11 determines whether or not the time T of the timer 15 exceeds 2 seconds (step 106). If the CPU 11 determines that the time T of the timer 15 does not exceed 2 seconds, the program returns to step 101, and determines whether or not another piece of lock command information is received.

If the CPU 11 determines at step 106 that the time T of the timer 15 exceeds 2 seconds, namely, if another piece of lock command information has not been received within 2 seconds since the lock command information was received, the CPU 11 clears the count C of the counter 14 (step 107), and then sets the time T of the timer 15 to 0 and terminates measuring the interval between pieces of the lock command information (step 108).

Figure 3A:
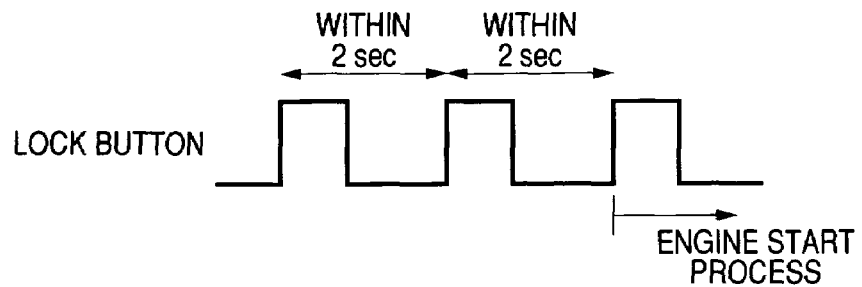
FIG. 3 is a drawing to show the button operation state of a transmitter for a keyless entry device.

On the other hand, if the CPU 11 determines at step 104 that the count C of the counter 14 is equal to 3, namely, if the lock button L is pressed three times at intervals of within 2 seconds as shown in FIG. 3A, the CPU 11 starts the engine start process (step 109). In the engine start process, the CPU 11 determines whether or not the safety conditions that the hood should be closed, that the shift lever should be at the parking position, that the brake should not operate, that the doors are closed, etc., are satisfied from outputs of the hood SW4, the parking SW5, the stop SW6, the courtesy SW 7, etc. Only if the safety conditions are satisfied, the CPU 11 turns on ACC output and IG output and turns on ST output only for a predetermined time to start the engine.

Figure 3B:
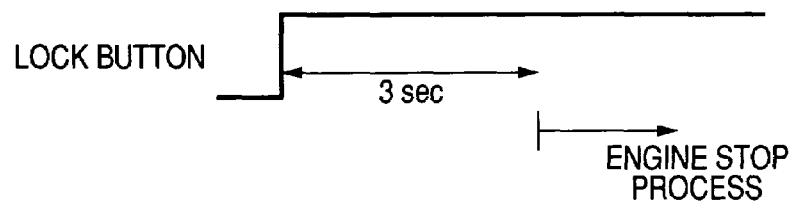

If the CPU 11 determines at step 102 that the reception information includes the long-press information as well as the lock command information, namely, if the lock button L is pressed for 3 seconds or more as shown in FIG. 3B, the CPU 11 turns off ACC output and IG output and executes the engine stop process (step 110). Upon completing the engine start process or the engine stop process, the CPU 11 clears the count C of the counter 14 and sets the time T of the timer 15 to 0, and then the program returns to step 101.

As described above, both remotely starting and remotely stopping the engine are executed by operating the lock button. Thus, to remotely start or stop the engine, the doors are always kept in the lock state, so that safety can be ensured. It is determined how the lock button L is operated, to remotely start or stop the engine. Therefore, it is possible to simplify the configuration of the transmitter 9.

In the embodiment described above, the engine is remotely started or stopped according to output of the keyless-entry ECU 3. A security ECU may be used in place of the keyless-entry ECU 3. Also, a unit including both the keyless and security ECUs integrally may also be used.

A transmitter of the security ECU includes an arming button for operating a security function and a disarming button for releasing the security function. Thus, in a case of using the security ECU, if the engine is remotely started or stopped in accordance with a way in which the arming button is operated, the security lock state can always be kept at a time of remotely starting or stopping the engine, so that safety can be ensured.

In the first embodiment, if lock command information is detected three times at intervals of within 2 seconds, the engine start process is performed. If the lock button is long pressed for 3 seconds or more, the engine stop process is performed. However, the detection time interval (predetermined time (e.g., 2 seconds) compared with the measured time T at step 106), the number of detection times (predetermined number (e.g., three times) compared with the count number C at step 104), and the long-press determination time (threshold time (e.g., 3 seconds) used to determine whether or not the lock button L is pressed long at step 102) may be changed, if necessary. The engine start process may be performed when the reception information including the lock command information and the long-press information are detected a predetermined number of times.

Modified Embodiment

In the first embodiment, if lock command information is detected three times at intervals of within 2 seconds, the engine start process is performed. If the lock button is long pressed for 3 seconds or more, the engine stop process is performed. However, an engine start condition and an engine stop condition are not limited thereto. Other conditions may be employed. A modified example of the first embodiment will be given below with reference to FIGS. 10A-10E, 11A and 11B.

Figure 11A:
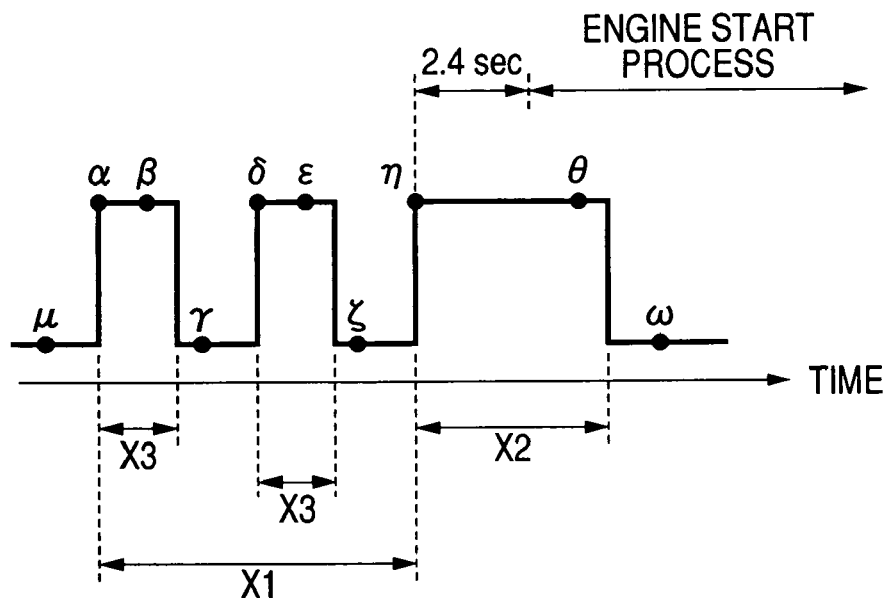
FIGS. 11A and 11B are drawings to show the button operation state of a transmitter of the keyless entry device.

In the modified example, when a user short presses the lock button L twice and then long presses the lock button L as shown in FIG. 11A, the starter ECU 1 performs the engine start process. Specifically, when the user presses the lock button L for 0.8 seconds or less (X3) two times within 2.5 seconds (X1) and then presses the lock button L for 2.4 seconds or more (X2), the starter ECU 1 performs the engine start process.

Figure 11B:
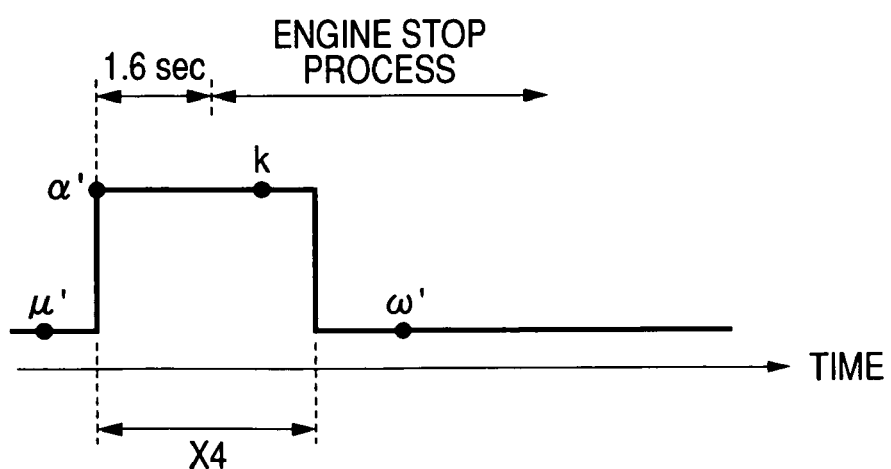

Also, in the modified example, when the user long presses the lock button L for 1.6 seconds or more once without short pressing the lock button L as shown in FIG. 11B, the starter ECU 1 performs the engine stop process.

In the modified embodiment, the keyless entry ECU 3, the lock motor 8 and the starter ECU 1 are connected to each other as shown in FIG. 1. Also, the transmitter 9 has the same configuration as that shown in FIG. 12. Upon receiving lock command or unlock command through the antenna 22, the keyless ECU 3 outputs a drive signal to the lock actuator of the lock motor 8. Simultaneously, the keyless ECU 3 keeps outputting lock command information or unlock command information to the starter ECU 1 through the in-vehicle LAN 2 during a period for which the keyless ECU 3 receives the lock command or the unlock command continuously. It is noted that in the modified embodiment, the keyless ECU 3 does not output short-press information or long-press information.

An operation of the starter ECU 1 of the modified embodiment will be detailed below with reference to flowcharts shown in FIGS. 10A-10E and examples of signal waveforms, which are transmitted from the transmission section 94 of the transmitter 9, shown in FIGS. 11A and 11B.

The CPU 11 of the starter ECU 1 always executes an engine start/stop program shown in the flowcharts of FIGS. 10A-10E. When the program starts, the CPU 11 initializes a variable C, times T1 and T2, which are measured by the timer 15, and flag f (step 401). Specifically, the CPU 11 sets the variable C, the times T1 and T2, and the flag f to 0. Then, the CPU 11 determines whether or not it receives lock command information from the keyless-entry ECU 3 through the in-vehicle LAN 2 (step 402).

If the determination at step 402 is affirmative, the CPU 11 checks value of C at steps 403-405. Specifically, firstly the CPU 11 determines whether or not C is equal to 0 (step 403). If the determination at step 403 is affirmative, the program proceeds to step 501 (see FIG. 10B). Otherwise, secondly the CPU 11 determines whether or not C is equal to 1 (step 404). If the determination at step 404 is affirmative, the program proceeds to step 601 (see FIG. 10C). Otherwise, thirdly the CPU 11 determines whether or not C is equal to 2 at step 405. If the determination at step 405 is affirmative, the program proceeds to step 701 (see FIG. 10D). Otherwise, C is equal to 3, and the program proceeds to step 801 (see FIG. 10E).

For example, at a time point α in FIG. 11A or a time point α' in FIG. 11B, the program proceeds to step 501. The CPU 11 sets the flag f to 1 (step 501) and causes the timer 15 to start measuring times T1 and T2 (steps 502 and 503. The counter 14 increments C by one (step 504). Then, the program returns to step 402. Here, the time T1 represents how long a user keeps pressing the lock button L, that is, corresponds to X2 and X3 in FIG. 11A and X4 in FIG. 11B. The time T2 represents a period from the beginning of a first short-press to the beginning of a long press following a second short-press, that is, corresponds to X1 in FIG. 11A. The value of C represents how many times the user presses the lock button L sequentially.

For example, at a time point β or δ in FIG. 11A or at a time point κ in FIG. 11B, the program proceeds to step 601. The CPU 11 determines whether or not the flag f is equal to 0 (step 601). If the determination at step 601 is affirmative (e.g., at the time point δ), the CPU 11 sets the flag f to 1 (step 602) and causes the timer 15 to start measuring the time T1 (step 603; start measuring a period for which the user keeps pressing the lock button L), and the counter 14 increments C by one (step 604; C becomes equal to 2, which means that the user presses the lock button two times sequentially). Then, the program returns to step 402.

If the determination at step 601 is negative (e.g., at the time point β in FIG. 11A or the time point κ in FIG. 11B), the CPU 11 determines whether or not the time T1 is equal to or longer than 1.6 seconds (step 605). In other words, the CPU 11 determines whether or not the user presses the lock button L long without short pressing the lock button L in order to remotely stop the engine of the vehicle. If the determination at step 605 is affirmative, satisfied is an engine stop condition that the user presses the lock button L for 1.6 seconds or longer without short pressing the lock button L. Therefore, the CPU 11 performs the engine stop process (step 606) and then, the program returns to the beginning (i.e., step 401).

On the other hand, if the determination at step 605 is negative, the program returns to step 402.

For example, at a time point ε or η in FIG. 1A, the program proceeds to step 701. The CPU 11 determines whether or not the flag f is equal to 0 (step 701). If the determination at step 701 is negative (e.g., at the time point ε), the program returns to step 402. Otherwise (e.g., at the time point η), the CPU 11 determines whether or not the time T2 measured by the timer 15 exceeds 2.5 seconds (step 702). If the determination at step 702 is affirmative, that is, the time T2 exceeds 2.5 seconds, the engine start condition cannot be satisfied (i.e., the condition that X1 is equal to or shorter than 2.5 seconds cannot be met). Therefore, the user's operation for starting the engine is deemed invalid, the program returns to step 401, and the CPU 11 again performs the initialization at step 401.

On the other hand, if the determination at step 702 is negative, the CPU 11 resets T2 to 0 (step 703; stop measuring the period from the beginning of the first short-press to the beginning of the long press following the second short-press) Then, the CPU 11 sets the flag f to 1 (step 704) and causes the timer 15 to start measuring the time T1 (step 705; start measuring a period of the long press). The counter 14 increments C by one (step 706; C becomes equal to 3, which means that the user presses the lock button three times sequentially) Then, the program returns to step 402.

For example, at a time point θ in FIG. 11A, the program proceeds to step 801. The CPU 11 determines whether or not the time T1 is equal to or longer than 2.4 seconds (step 801; determines whether or not the condition that X2 is equal to or longer than 2.4 seconds is satisfied). If the determination at step 801 is affirmative, the engine start condition described above is satisfied and therefore, the CPU 11 performs the engine start process (step 802), and the program returns to the beginning (i.e., step 401). Otherwise, the program returns to step 402.

Turning back to FIG. 10A, if the determination at step 402 is negative, that is, the starter ECU 1 does not receive the lock command information (e.g. a time point μ, γ, ζ or ω in FIG. 11A or a time point μ' or ω' in FIG. 11B), the CPU 11 determines whether or not C is equal to 3 (step 406). If the determination at step 406 is affirmative (e.g., at the time point ω), the user has completed to press the lock button L three times but the engine start condition has not been satisfied. Therefore, the user's operation for starting the engine is deemed invalid, the program returns to step 401 and the CPU 11 performs the initialization at step 401.

If the determination at step 406 is negative (e.g., time at the time point μ, γ, ζ or ω in FIG. 11A or the time point μ' or ω' in FIG. 11B), the CPU 11 determines whether or not whether or not the time T1 exceeds 0.8 seconds (step 407; determines whether or not X3 exceeds 0.8 seconds). If the determination at step 407 is affirmative, that is, the time T1 exceeds 0.8 seconds, the engine start condition cannot be satisfied (the condition that X3 is equal to or shorter than 0.8 seconds cannot be met). Therefore, the user's operation for starting/ stopping the engine is deemed invalid, the program returns to step 401, and the CPU 11 again performs the initialization at step 401.

If the determination at step 407 is negative, this determination means that the user pressed the lock button L for 0.8 seconds or less. The CPU 11 resets the time T1 to 0 (step 408) and sets the flag f to 0 (step 409). Then, the program returns to step 402.

In the modified embodiment, when the user operates the lock button L of the transmitter 9 in a first predetermined way (that is, so as to meet the engine start condition), the remote start controller (the starter ECU 1) performs the engine start process. Specifically, the operating of the lock button in the first predetermined way includes pressing the lock button L for less than a first predetermined period (e.g., 0.8 seconds) and pressing the lock button L for longer than a second predetermined period (e.g., 2.4 seconds). Also, the second predetermined period (e.g., 2.4 seconds) is longer than the first predetermined period (e.g., 0.8 seconds).

According to the modified embodiment, both remotely starting and remotely stopping the engine are executed by operating the lock button. Thus, to remotely start or stop the engine, the doors are always kept in the lock state, so that safety can be ensured. It is determined how the lock button L is operated, to remotely start or stop the engine. Therefore, it is possible to simplify the configuration of the transmitter 9.

Second Embodiment

In the embodiment described above, the starter ECU 1 executes remote starting and stopping of the engine based on the reception information output from the keyless-entry ECU 3 to the in-vehicle LAN 2. However, the engine can also be remotely started and stopped based on a lock drive signal output from the keyless-entry ECU 3 to the lock motor 8. An embodiment for remotely starting and stopping the engine based on the lock drive signal output from the keyless-entry ECU 3 will be discussed with reference to a block diagram of FIG. 4, a flowchart of FIG. 5, and a signal waveform chart of FIG. 6.

Figure 4:
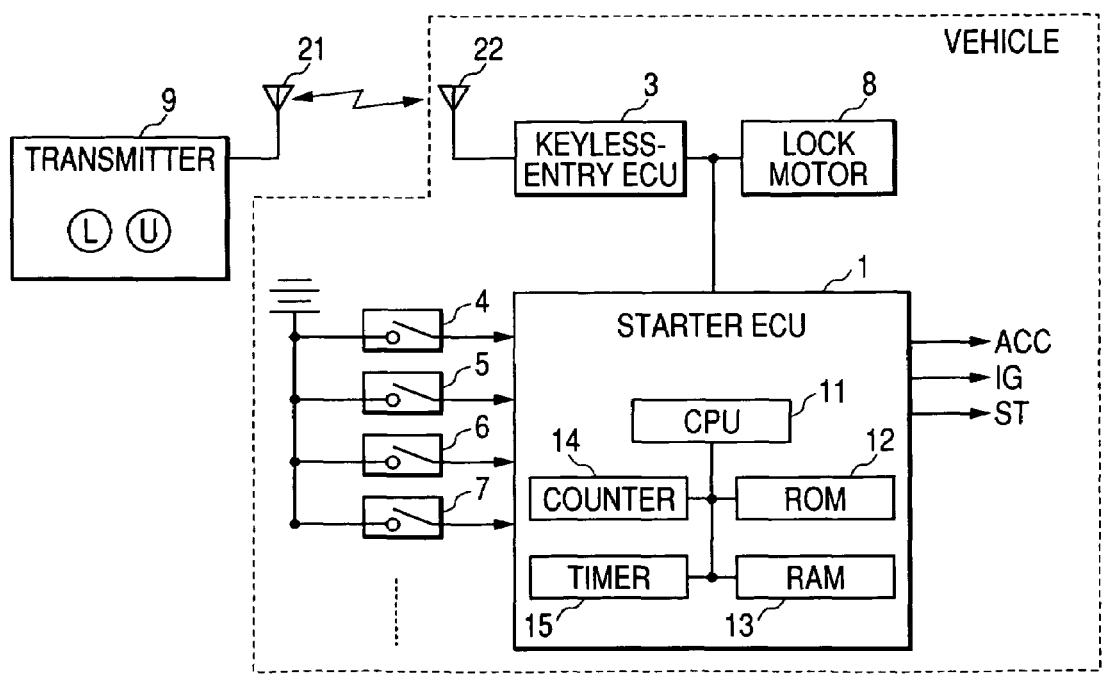
FIG. 4 is a schematic block diagram to show a remote start controller for remotely starting and stopping an engine based on a lock drive signal output by a keyless-entry ECU.

FIG. 4 is a schematic block diagram to show a remote start controller according to a second embodiment of the invention. As shown in the figure, a starter ECU 1 serving as a remote start controller and other components are similar to those previously described with reference to FIG. 1. A lock drive signal output from the keyless-entry ECU 3 to a lock motor 8 is input to the starter ECU 1 as well. Also, a transmitter 9 has the same configuration as that of the first embodiment.

Upon receiving a lock/unlock command from a transmitter 9, the keyless-entry ECU 3 outputs the lock drive signal or an unlock drive signal to the lock motor 8 in accordance with the received command, to thereby perform lock/unlock control of doors. The starter ECU 1 remotely starts and stops the engine by monitoring the lock drive signal. An example of the operation of the starter ECU 1 will be described below with reference to the flowchart shown in FIG. 5 and the signal waveform chart shown in FIG. 6. In the example, when the keyless-entry ECU 3 outputs the lock drive signal three times within 3 seconds, the starter ECU 1 performs the engine start process. Also, when the keyless-entry ECU 3 outputs the lock signal two times within 3 seconds, the starter ECU 1 performs the engine stop process.

Figure 6A:
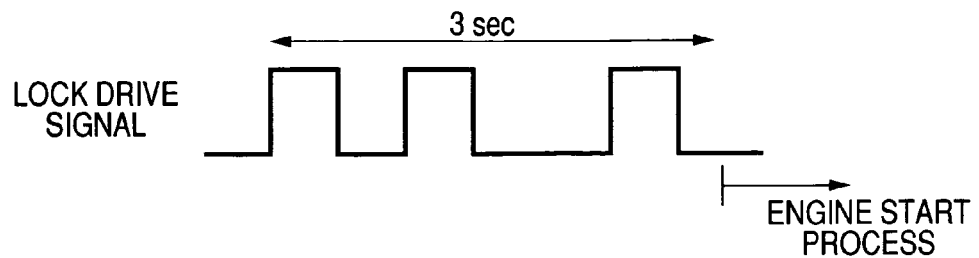
FIG. 6 is a signal waveform chart to show lock drive signals.
Figure 6B:
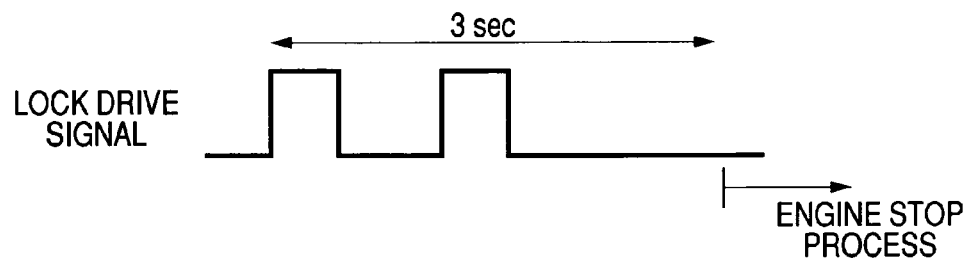

When a user turns on a lock button L of the transmitter 9, the transmitter 9 transmits a lock command to the keyless-entry ECU 3 through an antenna 21 during the time period over which the lock button L is turned on. Upon receiving the lock command through an antenna 22, the keyless-entry ECU 3 outputs the lock drive signal to lock the doors of the vehicle in response to the lock command. FIGS. 6A and 6B shows examples of waveforms of lock drive signals.

Figure 5:
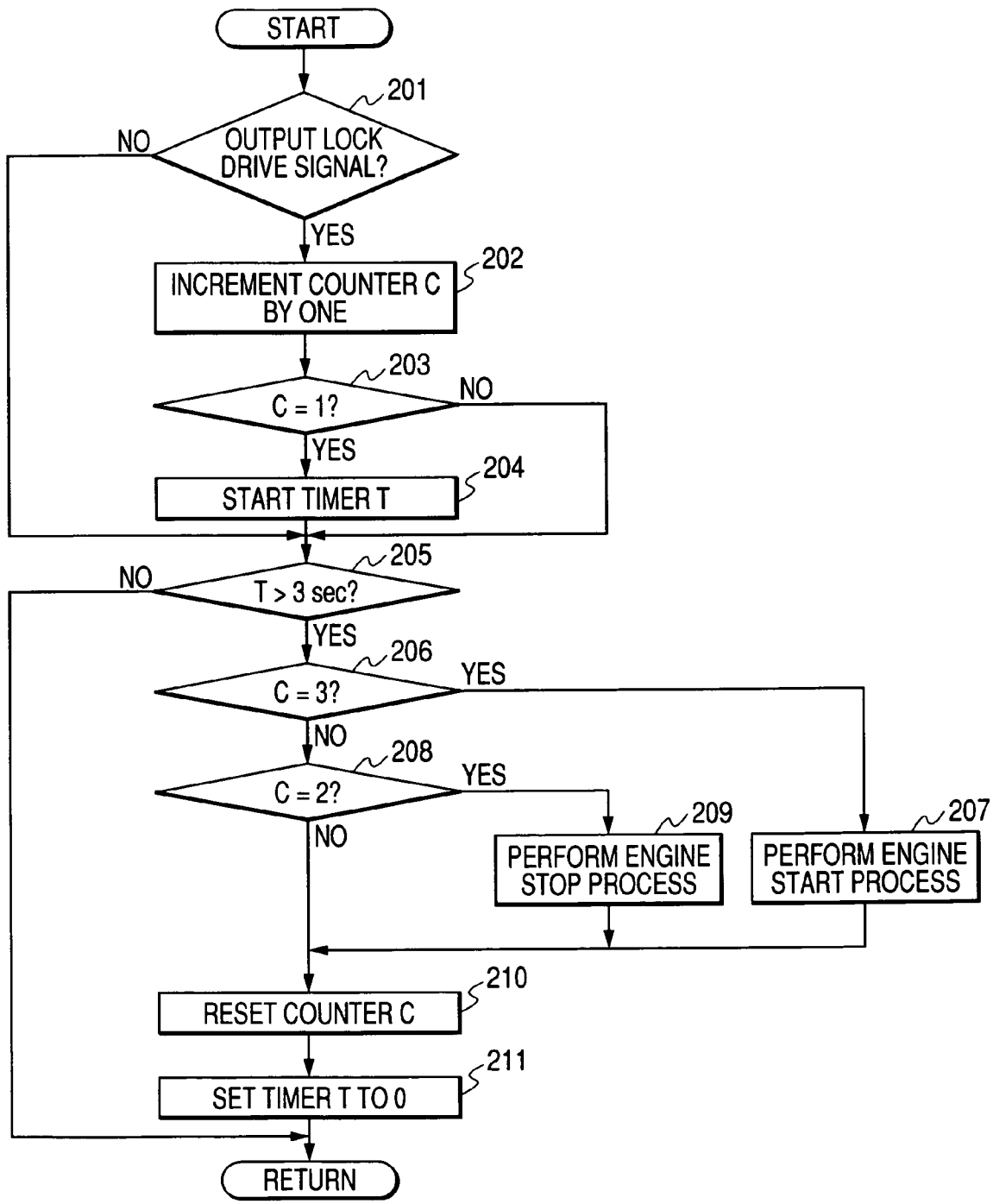
FIG. 5 is a flowchart to show the operation of the remote start controller in FIG. 4.

On the other hand, a CPU 11 of the starter ECU 1 always executes an engine start/stop program shown in the flowchart of FIG. 5. When the program is started, first the CPU 11 determines whether or not a lock drive signal is output from the keyless-entry ECU 3 by detecting the rising edge of the lock drive signal (step 201). If the CPU 11 concludes that a lock drive signal is output, the CPU 11 increments count C of a counter 14 by one (step 202).

Next, the CPU 11 determines whether or not the count C of the counter 14 is equal to 1 (step 203). If the CPU 11 concludes that the count C is equal to 1, the CPU 11 starts to causes a timer 15 to start measuring time T (step 204). If the CPU 11 concludes at step 201 that a lock drive signal is not output, if the CPU 11 concludes at step 203 that the count C is not 1, or if the CPU 11 causes the timer 15 to start measuring the time T at step 204, the CPU 11 determines whether or not time T of the timer 15 exceeds 3 seconds (step 205). If the CPU 11 concludes that the time T of the timer 15 does not exceed 3 seconds, the program returns to step 201 and determines whether or not another lock drive signal is output.

On the other hand, if the CPU 11 concludes at step 205 that the time T of the timer 15 exceeds 3 seconds, the CPU 11 determines whether or not the count C of the counter 14 is equal to 3 (step 206). If the CPU 11 concludes that the count C of the counter 14 is equal to 3, the CPU 11 performs the engine start process (step 207). If the CPU 11 concludes that the count C of the counter 14 is not equal to 3, the CPU 11 determines whether or not the count C of the counter 14 is equal to 2 (step 208). If the CPU 11 determines that the count C of the counter 14 is equal to 2, the CPU 11 performs the engine stop process (step 209).

That is, when 3 seconds has elapsed since output of the lock drive signal was detected and the lock drive signal has been detected three times as shown in FIG. 6A, the engine start process is performed. When 3 seconds has elapsed since output of the lock drive signal was detected and the lock drive signal has been detected two times as shown in FIG. 6B, the engine stop process is performed.

If the CPU 11 determines at step 208 that the count C of the counter 14 is not equal to 2, the CPU 11 resets the count C of the counter 14 to 0 (step 210), and then sets the time T of the timer 15 to 0 and terminates measuring the time (step 211). That is, if the count C of the counter 14 is equal to 1 or 4 or more after the expiration of 3 seconds, the CPU 11 does not perform any processing and again starts the program.

Upon completing the engine start process at step 207 or the engine stop process at step 209, the CPU 11 also resets the count C of the counter 14 to 0 and terminates measuring the time of the timer 15.

As described above, both remote starting and stopping the engine are executed in response to a way in which the lock button is operated, as with the first embodiment. Thus, to remotely start or stop the engine, the doors can always be kept in the lock state and safety can be ensured.

In the embodiment described above, the engine is remotely started or stopped according to output of the keyless-entry ECU 3, but an ECU including both keyless and security ECUs integrally may also be used.

In the embodiment described above, if the lock drive signal is output three times within three minutes, the engine start process is performed and if the lock drive signal is output twice within three minutes, the engine stop process is performed. However, the detection time interval (e.g., 3 seconds (see step 205)) and the number of detection times (e.g., two times (step 208) or three times (step 206)) may be changed if necessary, as with the first embodiment.

Third Embodiment

In the embodiments described above, separate ECUs are used as the keyless-entry ECU and the starter ECU. However, a keyless function may be incorporated into a starter ECU. An embodiment in which the keyless function is incorporated into a starter ECU will be discussed with reference to a block diagram of FIG. 7, a flowchart of FIG. 8, and a button operation state diagram of FIG. 9.

Figure 7:
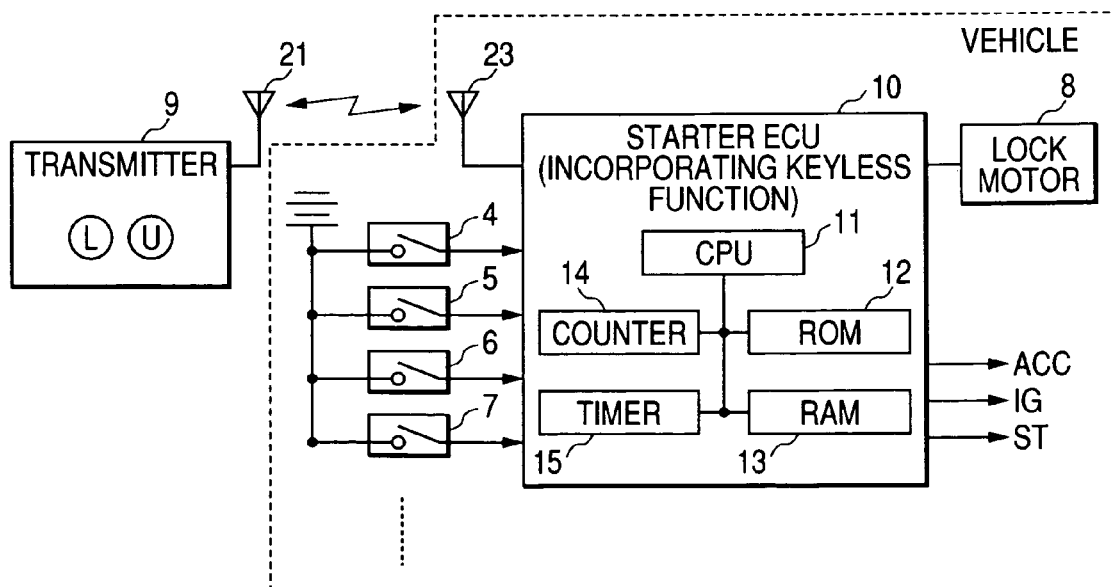
FIG. 7 is a schematic block diagram to show a remote start controller having a starter ECU incorporating a keyless function.

FIG. 7 is a schematic block diagram to show a remote start controller according to a third embodiment of the invention. As shown in the figure, a starter ECU 10 serving as a remote start controller includes an antenna 23 for receiving a lock/unlock command from a transmitter 9, drives a lock motor 8 in accordance with the received command and remotely starts and stops an engine of the vehicle.

The starter ECU 10 includes a CPU 11, ROM 12, RAM 13, a counter 14, and a timer 15. The timer 15 measures reception time period during which the starter ECU 10 keeps receiving a transmission signal of a lock/unlock command from the transmitter 9, and interval between transmission signals of the lock/unlock command. Outputs of various switches and sensors such as a hood SW 4, a parking SW 5, a stop SW6, and a courtesy SW 7 are input to the starter ECU 10. The starter ECU 10 outputs a lock drive signal or an unlock drive signal to the lock motor 8.

The CPU 11, ROM 12 and RAM 13 constitute a keyless entry section for performing lock and unlock control of the doors of a vehicle in accordance with user's operation with respect to a lock button L and an unlock button U of the transmitter 9, and a remote control section for remotely starting and stopping the engine. These functions are executed by a software program.

Figure 12:
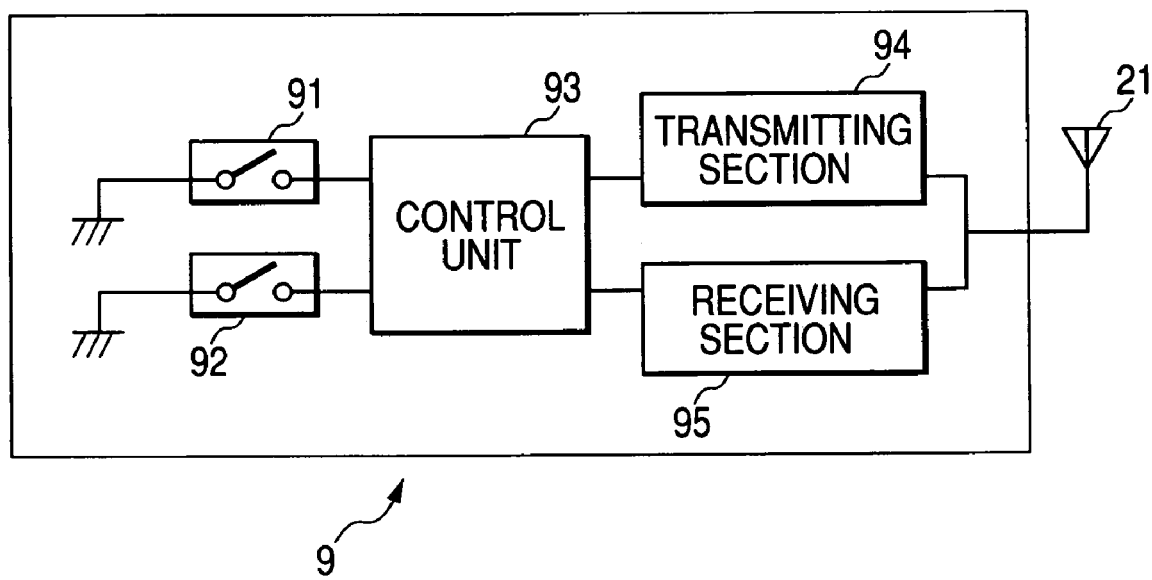
FIG. 12 is a block diagram to show a detailed configuration of the transmitter 9.

On the other hand, the transmitter 9 includes an antenna 21, the lock button L, the unlock button U, a lock switch 91, an unlock switch 92, a control unit 93, a transmission section 94 and a receiving section 95 (see FIG. 12). The lock switch 91 and the unlock switch 92 are conjunction with the lock button L and the unlock button U, respectively. The control unit 93 includes a CPU and a memory storing an ID code (not shown). When the user turns on the lock button L or the unlock button U, the control unit 93 generates a function code indicating the pressed button (that is, the lock button L or the unlock button U), and causes the transmitter 9 to transmit a pair of the generated function and the ID code stored in the memory to the starter ECU 10 through the antenna 21 as a lock/unlock command.

The starter ECU 10 performs door lock/unlock process and a remote start process or a remote stop process of the engine based on the lock/unlock command, which is transmitted from the transmitter 9 and received at the antenna 23. An example of the operation of the starter ECU 10 will be described below with reference to a flowchart shown in FIG. 8 and a button operation state chart shown in FIG. 9. In the example, when the starter ECU 10 receives a lock command from the transmitter 9 three times at intervals of within 2 seconds, the starter ECU 10 performs the engine start process. Also, when the starter ECU 10 detects that the lock button L of the transmitter 9 is turned on continuously for 3 seconds or more, the starter ECU 10 performs the engine stop process.

Figure 8:
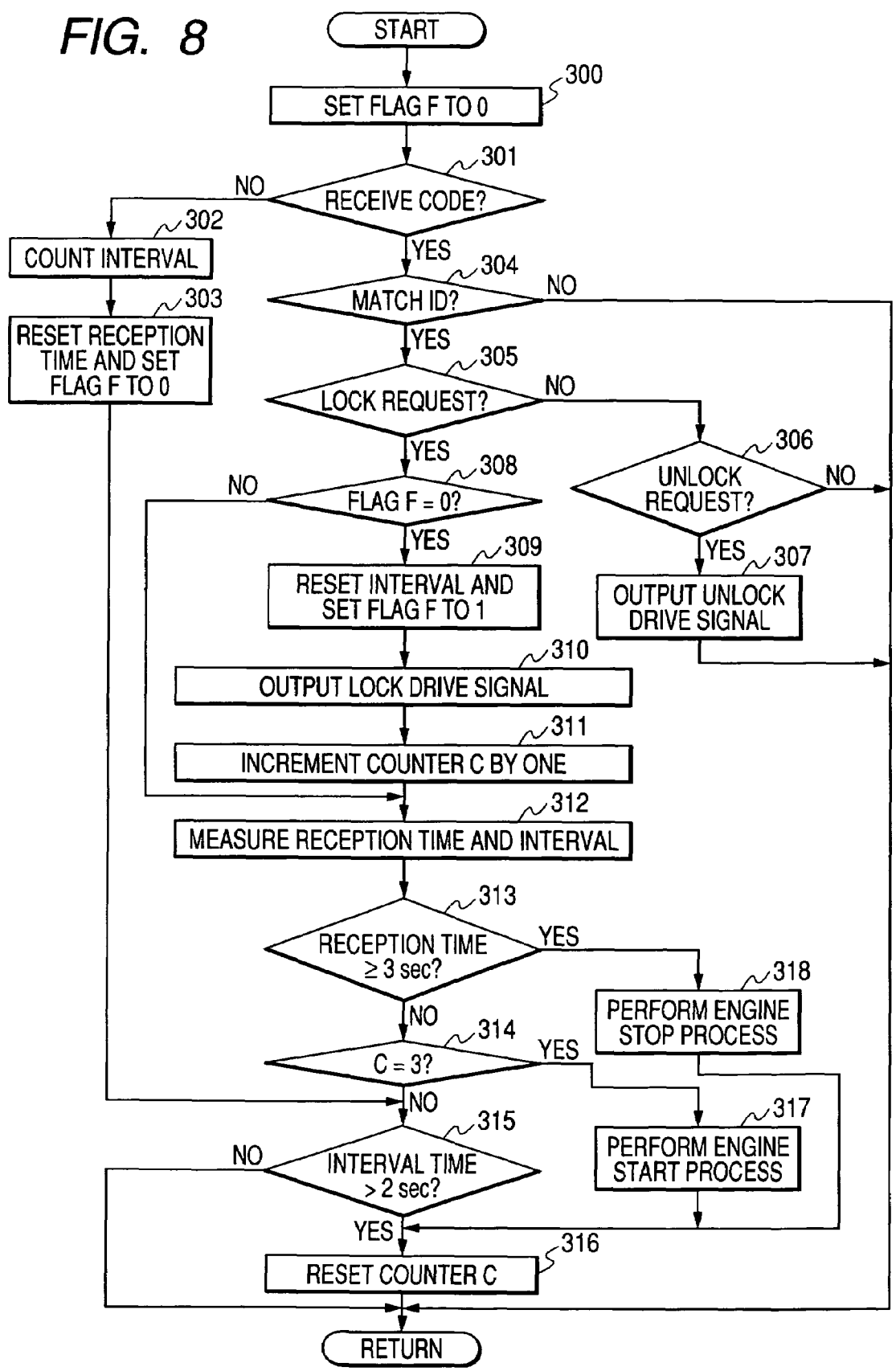
FIG. 8 is a flowchart to show the operation of the remote start controller in FIG. 7.

The CPU 11 of the starter ECU 10 always executes a program shown in the flowchart of FIG. 8. When the program is started, first the CPU 11 sets a flag f to 0 (step 300) and then, the CPU 11 determines whether or not a transmission code is received from the transmitter 9 (step 301). If the CPU 11 concludes that the transmission code is not received, the CPU 11 measures interval between receptions of transmission codes by the timer 15 (step 302). Next, the CPU 11 resets to 0 reception time during which the transmission code is received continuously, which is measured by the timer 15 and sets the flag f to 0 (step 303).

On the other hand, if the CPU 11 determines at step 301 that a transmission code is received from the transmitter 9, the CPU 11 compares the received ID code with the authorized ID code registered in the RAM 13, to thereby determine whether or not the received ID code matches the authorized ID code (step 304). If they do not match, the process is terminated. If the CPU 11 concludes that the received ID code matches the authorized ID code, the CPU 11 compares the received function code with a function code, which indicates the lock request and is stored in the RAM 13, to thereby determine whether or not the command transmitted from the transmitter 9 is a lock request (step 305).

If the CPU determines that the command transmitted from the transmitter 9 is not a lock request, the CPU 11 compares the received function code with a function code, which indicates the unlock request and is stored in the RAM 13, to thereby determine whether or not the command transmitted from the transmitter 9 is an unlock request (step 306). If the CPU concludes that the command transmitted from the transmitter 9 is an unlock request, the CPU 11 outputs an unlock drive signal to the lock motor 8 (step 307). If the CPU concludes at step 306 that the command transmitted from the transmitter 9 is not an unlock request, the CPU 11 terminates the process.

On the other hand, if the CPU concludes at step 305 that the command from the transmitter 9 is a lock request, the CPU 11 determines whether or not the flag f is equal to 0 (step 308).

If the CPU 11 determines at step 308 that the flag f is equal to 0, the CPU 11 resets the interval measured by the timer 15 to 0 and sets the flag f to 1 (step 309). The CPU 11 outputs a lock drive signal to the lock motor 8 (step 310). Then increments count C of the counter 14 by one (step 311). If the CPU 11 determines at step 308 that the flag f is not equal to 1 or after the count C of the counter 14 is incremented by one at step 311, the CPU 11 causes the timer 15 to measure the reception time during which the transmission code is received continuously, and the interval between transmission signals of the lock/unlock command(step 312).

Accordingly, if the user turns on the lock button L of the transmitter 9, the CPU 11 resets the interval time of the timer 15 to 0 and increments the counter 14 at timing when a lock-button signal rises (see FIG. 9). Then, the CPU 11 causes the timer 15 to keep measuring the reception time until the user turns off the lock button L.

Next, the CPU 11 determines whether or not the reception time measured by the timer 15 exceeds 3 seconds (step 313). If the CPU 11 concludes that the reception time does not exceed 3 seconds, the CPU 11 determines whether or not the count value C of the counter 14 is equal to 3 (step 314). If the CPU 11 concludes that the count value C of the counter 14 is not equal to 3 or upon completing resetting the reception time to 0 and setting the flag f to 0 at step 303, the CPU 11 determines whether or not the interval measured by the timer 15 exceeds 2 seconds (step 315). If the interval measured by the timer 15 does not exceed 2 seconds, the program returns to step 301 and the CPU 11 determines whether or not a transmission code is received.

If the CPU 11 concludes at step 315 that the interval measured by the timer 15 exceeds 2 seconds, the CPU 11 concludes that another transmission code is not received within 2 seconds, and resets the count value C of the counter 14 to 0 (step 316).

Figure 9A:
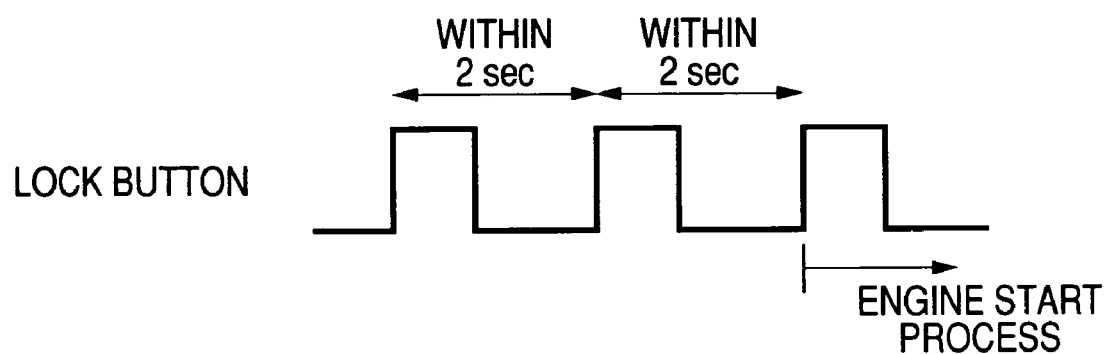
FIG. 9 is a drawing to show the button operation state of a transmitter for the remote start controller in FIG. 7.
Figure 9B:
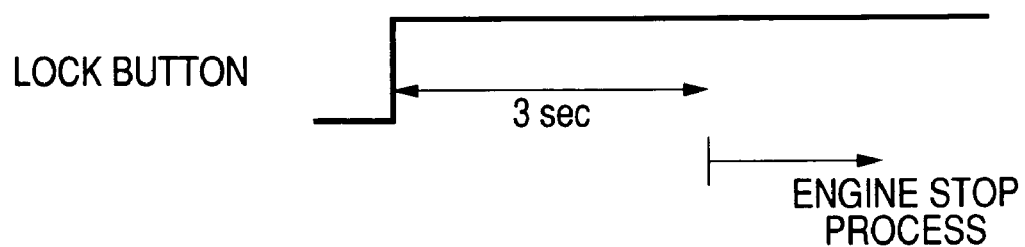
Figure 10A:
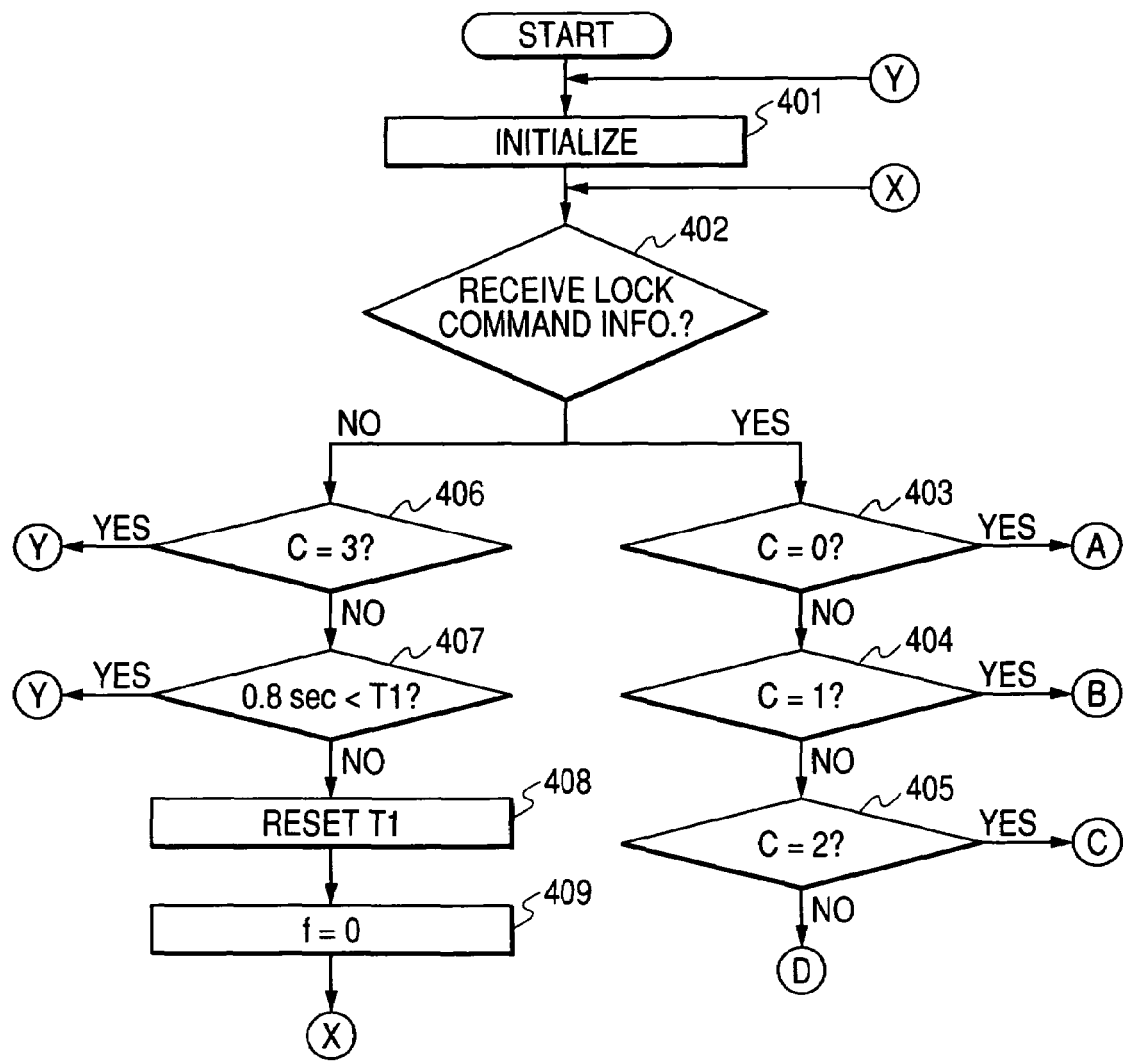
FIGS. 10A-10E are flowcharts to show the operation of the remote start controller of a modified embodiment.
Figure 10B:
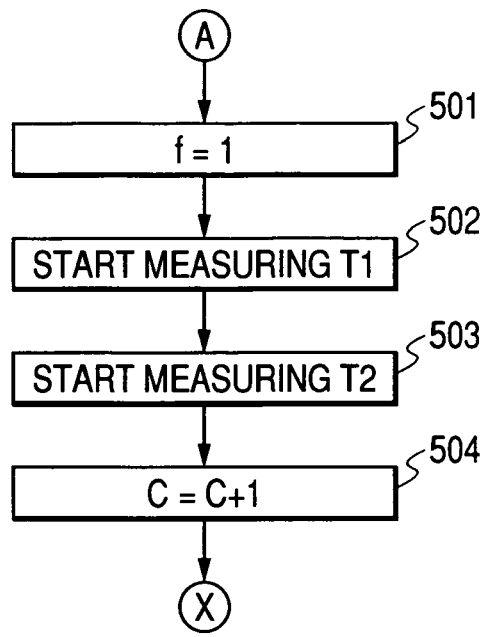
Figure 10C:
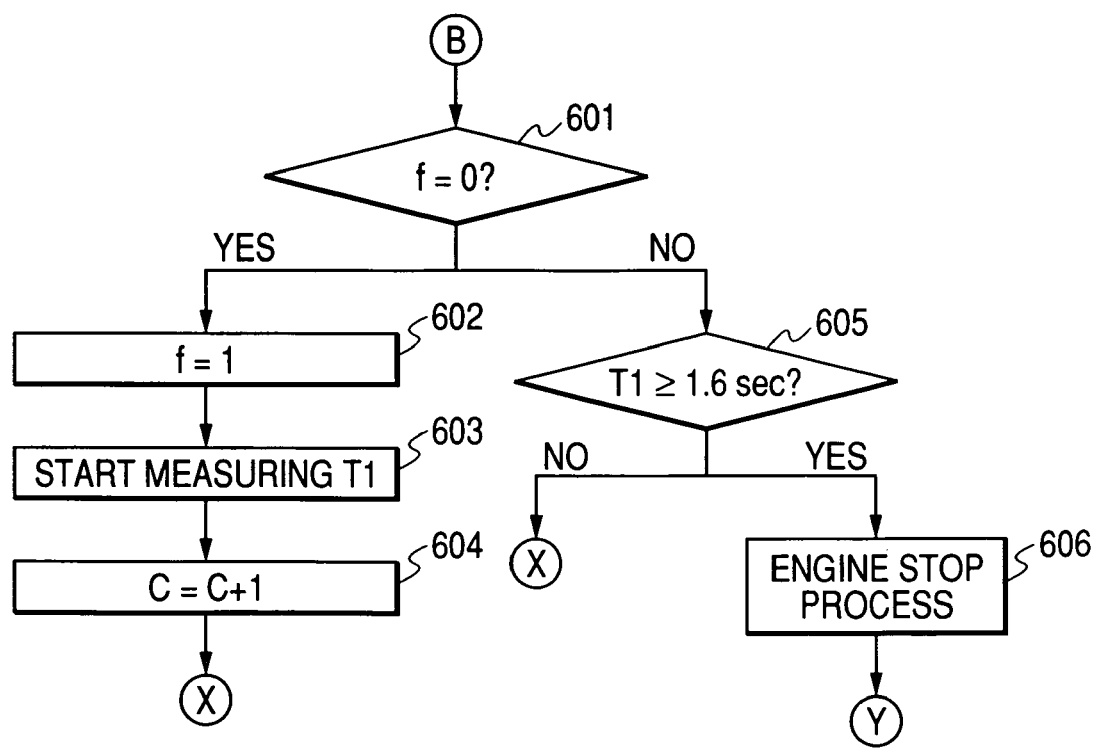
Figure 10D:
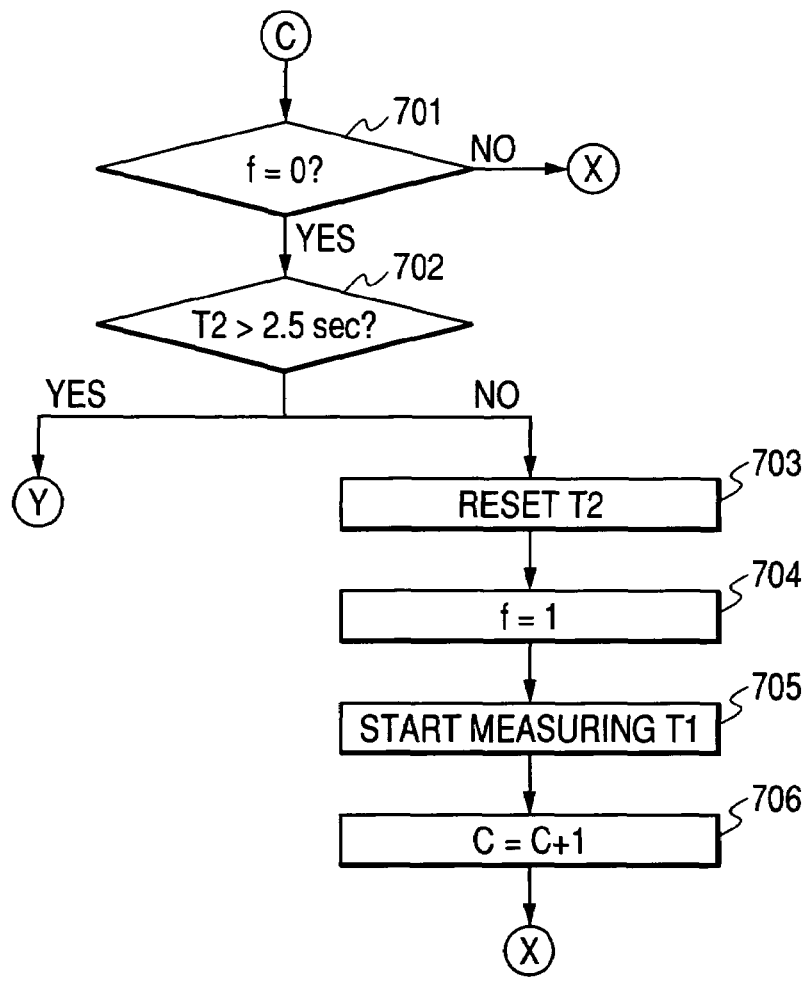
Figure 10E:
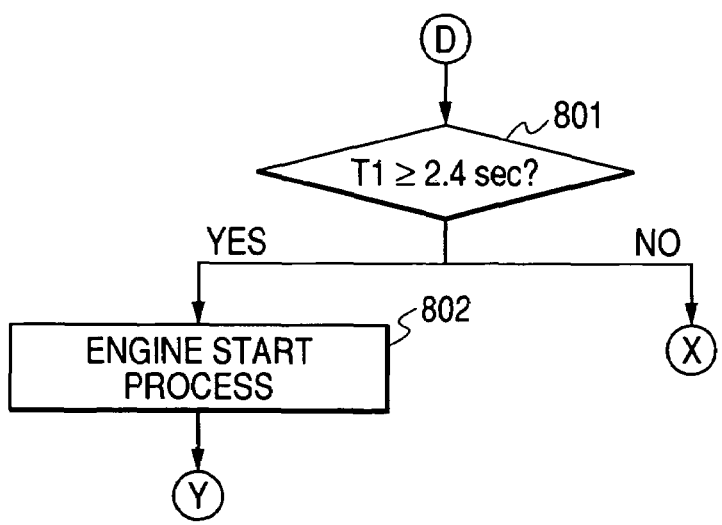

On the other hand, if the CPU 11 concludes at step 314 that the count value C of the counter 14 is equal to 3, namely, when the lock button L has been turned on three times at the intervals of within 2 seconds as shown in FIG. 9A, the CPU 11 starts the engine start process (step 317). If the CPU 11 concludes at step 313 that the reception time exceeds 3 seconds, namely, when the lock button L is pressed for 3 seconds or more as shown in FIG. 9B, the CPU 11 starts the engine stop process (step 318).

Upon completing the engine start process at step 317 or the engine stop process at step 318, the CPU 11 resets the count C of the counter 14 to 0 (step 316).

As described above, also in the third embodiment, remote starting or remote stopping the engine is executed when the lock button is turned on. Thus, to remotely start or stop the engine, the doors can always be kept in the lock state and safety can be ensured. Since the starter ECU incorporates the keyless function, the keyless-entry ECU becomes unnecessary and the configuration can be simplified.

In the third embodiment, the starter ECU incorporates the keyless function. However, the starter ECU may incorporate a security function in place of the keyless function. In this case, the "lock button" is replaced with "arming button" and the "unlock button" is replaced with "disarming button." With this configuration, remote starting and stopping the engine can be executed in a similar manner. Further, the starter ECU may incorporate both the keyless function and the security function.

In the embodiment described above, when a lock command is received three times at the intervals of within 2 seconds, the engine start process is performed. If it is detected that the lock button L of the transmitter 9 is turned on for 3 seconds or more, the engine stop process is performed. However, the detection time interval (first predetermined time (e.g., 2 seconds) compared with the interval at step 315), the number of detection times (predetermined number (e.g., 3) compared with the count value C at step 314), and the on detection time (second predetermined time (e.g., 3 seconds) compared with the reception time at step 312) can be changed if necessary, as with the embodiments described above.

What is claimed is:

1. A remote start controller mounted on a vehicle, which includes a keyless entry device for controlling a locking action of doors of the vehicle in response to a user's operation with respect to a single lock button of a transmitter, the remote start controller comprising:
   a CPU, wherein upon detecting that the single lock button of the transmitter is operated in a first predetermined way, the CPU simultaneously causes the doors of the vehicle to lock and an engine of the vehicle to start,
   wherein upon detecting that the single lock button of the transmitter is operated in a second predetermined way different from the first predetermined way, the CPU simultaneously causes the doors of the vehicle to lock and the engine to stop.

2. The remote start controller according to claim 1, wherein:
   the keyless entry device outputs reception information transmitted from the transmitter, and the CPU detects how the single lock button of the transmitter is operated, on a basis of the reception information outputted from the keyless entry device.

3. The remote start controller according to claim 1, wherein the CPU detects how the single lock button of the transmitter is operated on a basis of a drive signal outputted from the keyless entry device to a lock actuator of the vehicle.

4. The remote start controller according to claim 1, wherein the operating of the single lock button in the first predetermined way is performed within a predetermined period.

5. The remote start controller according to claim 4, wherein:
the operating of the single lock button in the first predetermined way comprises operating the single lock button in a third predetermined way and operating the single lock button in a fourth predetermined way different from the third predetermined way.

6. The remote start controller according to claim 1, wherein:
the operating of the single lock button in the first predetermined way comprises pressing the single lock button for less than a first predetermined period and pressing the single lock button for longer than a second predetermined period, and
the second predetermined period is longer than the first predetermined period.

7. A remote start controller comprising:
a keyless entry section that controlling a locking action of doors of a vehicle in response to a user's operation with respect to a single lock button of a transmitter; and
a remote start controlling section that controls starting of an engine of the vehicle, wherein:
upon detecting that the single lock button of the transmitter is operated in a first predetermined way, the remote start controlling section simultaneously causes the doors of the vehicle to lock and the engine of the vehicle to start, and
upon detecting that the single lock button of the transmitter is operated in a second predetermined way different from the first predetermined way, the remote start controlling section simultaneously causes the doors of the vehicle to lock and the engine of the vehicle to stop.

8. A remote start controller mounted on a vehicle, which includes an antitheft apparatus for setting a security function for the vehicle in response to a user's operation with respect to a single arming button of a transmitter, the remote start controller comprising:
a CPU, wherein upon detecting that the single arming button of the transmitter is operated in a first predetermined way, the CPU simultaneously causes the security function for the vehicle to set and an engine of the vehicle start,
wherein upon detecting that the single arming button of the transmitter is operated in a second predetermined way different from the first predetermined way, the CPU causes the security function for the vehicle to set and the engine to stop.

* * * * *